United States Patent [19]

Hiraoka et al.

[11] Patent Number: 5,317,703
[45] Date of Patent: May 31, 1994

[54] INFORMATION PROCESSING APPARATUS USING AN ADVANCED PIPELINE CONTROL METHOD

[75] Inventors: Tooru Hiraoka; Kouji Nakamura, both of Hadano; Tohru Shonai, Kodaira, all of Japan

[73] Assignee: Hitachi, Ltd., Tokyo, Japan

[21] Appl. No.: 797,892

[22] Filed: Nov. 26, 1991

Related U.S. Application Data

[63] Continuation-in-part of Ser. No. 724,113, Jul. 1, 1991.

[30] Foreign Application Priority Data

Jun. 29, 1990 [JP] Japan .................................. 2-170036
Nov. 28, 1990 [JP] Japan .................................. 2-326499

[51] Int. Cl.[5] .......................... G06F 9/38; G06F 9/30
[52] U.S. Cl. .................................. 395/375; 395/200; 395/250; 364/261.3; 364/261.4; 364/261.5; 364/262.4; 364/271.8; 364/271.9; 364/DIG. 1; 364/DIG. 2
[58] Field of Search ............... 395/375, 800, 425, 725, 395/775; 364/DIG. 1, DIG. 2

[56] References Cited

U.S. PATENT DOCUMENTS

| | | | |
|---|---|---|---|
| 4,773,002 | 9/1988 | Iwasaki et al. | 395/375 |
| 4,827,402 | 5/1989 | Wada | 395/375 |
| 4,853,840 | 8/1989 | Shibuya | 395/375 |
| 4,881,170 | 11/1989 | Morisada | 395/375 |

FOREIGN PATENT DOCUMENTS 63-231672 9/1988 Japan .

*Primary Examiner*—Alyssa H. Bowler
*Assistant Examiner*—Drung C. Nguyen
*Attorney, Agent, or Firm*—Antonelli, Terry, Stout & Kraus

[57] ABSTRACT

An information processing method and apparatus for applying pipeline control and an advanced control to a sequence of instructions to be executed. The instruction sequence contains a plurality of conditional branch instructions. The apparatus includes a section for sequentially holding therein each instruction of the sequence of instructions to be input in a manner like a pipeline operation; an arithmetic section for obtaining a result of an operation of an instruction associated with each of the plural conditional branch instructions of the instruction sequence and selecting, from the associated instruction, instructions for which an advanced operation is possible so as to attain an operation result for each of the instructions thus selected; a holding section for holding therein either one of the operation result attained for each of the associated instructions and the operation result obtained in advance and outputting, at an execution of an objective conditional branch instruction selected from the plural conditional branch instruction; the operation result of a particular instruction corresponding to the objective conditional branch instruction, and a judge section for comparing branch control information of the objective conditional branch instruction with the operation result outputted from the holding means to judge a branch success or failure for the objective conditional branch instruction so as to decide a next instruction to be executed in accordance with the objective conditional branch instruction.

10 Claims, 4 Drawing Sheets

INFORMATION PROCESSING APPARATUS USING AN ADVANCED PIPELINE CONTROL METHOD

CROSS-REFERENCE TO RELATED APPLICATION

The present invention is a continuation-in-part application of U.S. patent application Ser. No. 07/724,113, entitled "Method and Apparatus for Controlling Conditional Branch Instructions for a Pipeline Type Data Processing Apparatus" filed on Jul. 1, 1991. The U.S. patent application Ser. No. 07/724,113, is assigned to the same assignee with the present application and is incorporated herein by reference.

BACKGROUND OF THE INVENTION

1. Field of the Invention

The present invention relates to an advanced control method for use in an information processing apparatus, and in particular, to an advanced control method in an information processing apparatus employing a pipeline control method in which even when a conditional branch instruction is supplied to a pipeline of the apparatus, an advanced control is achieved to efficiently continue the instruction processing.

2. Description of Related Art

In the conventional information processing apparatus, to execute instruction processing at high speed, there have been generally adopted a pipeline control and an advanced control when executing instructions. In such an apparatus, when a branch instruction is processed, a processing flow of the advanced control is disturbed and hence the processing efficiency may possibly be reduced in some cases.

Figure 3:
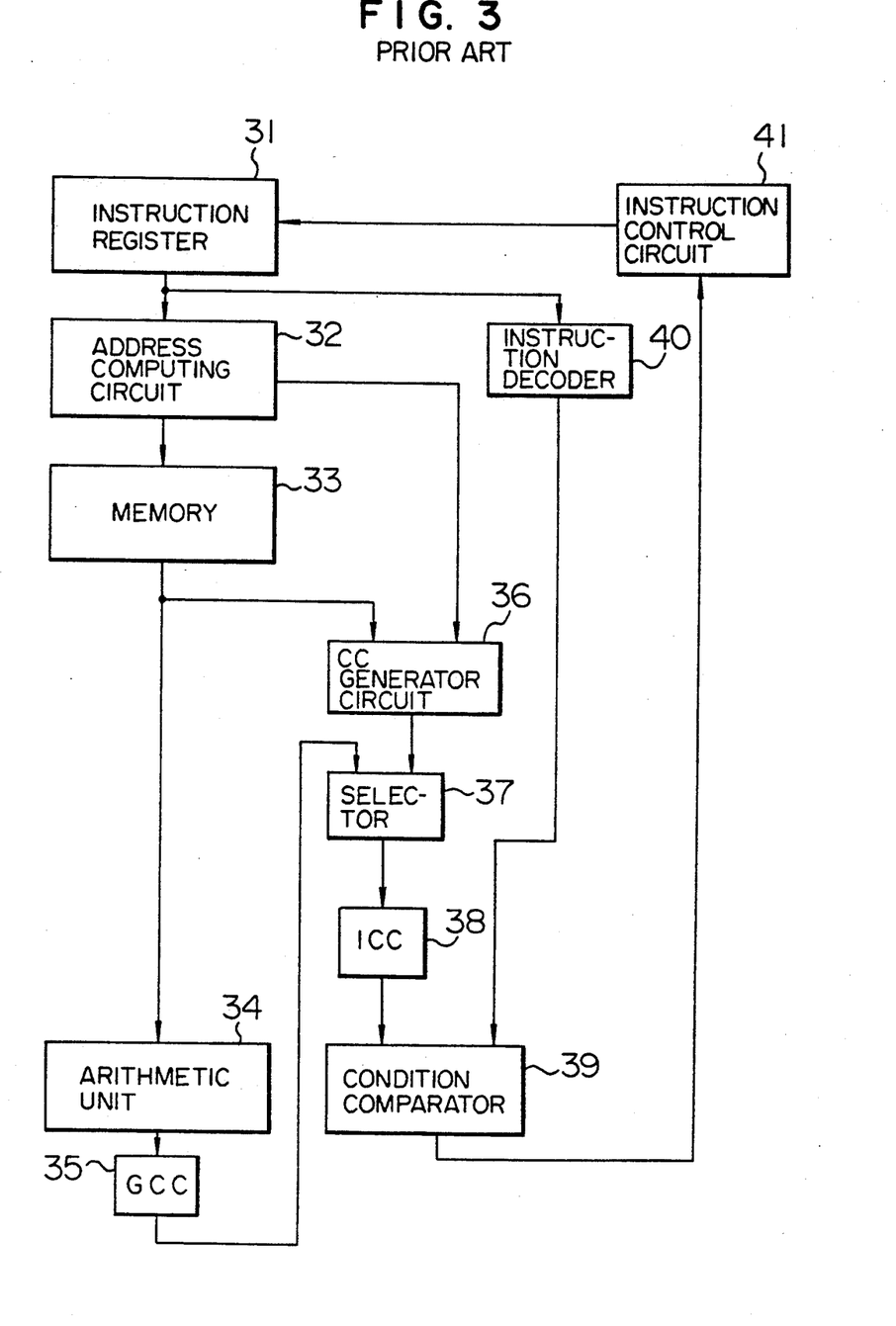
FIG. 3 is a block diagram showing the configuration of the primary portion of a conventional information processing apparatus using a pipeline control method.

FIG. 3 is a block diagram showing the primary portion of the conventional information processing apparatus employing a pipeline control. The apparatus of FIG. 3 includes an instruction register 31, an address computing circuit 32, a memory 33, an arithmetic unit 34, a register (GCC) 35 for storing therein a condition code resultant from a computation, an advanced control condition code generating circuit 36, a selector 37, a condition code storing register (ICC) 38, a condition comparator 39, an instruction decoder 40, and an instruction control circuit 41.

In operation, upon receiving an instruction from the instruction register 31, the circuit 32 executes an address computation if the computation is necessary for the received instruction. Otherwise, for example, for an instruction of an operation between registers, the circuit 32 conducts the operation. Data read from the memory 33 for the instruction is supplied to the arithmetic unit 34 and then the data is subjected to the operation. A condition code representing an operation result from the unit 34 is stored in the GCC 35. The condition code (CC) generator circuit 36 checks the operation result from the circuit 32 and the data from the memory 33 to attain a condition code for an advanced control. The advanced control CC thus obtained is fed to the selector 37. The selector 37 selects either one of the received CCs. The CC selected by the selector 37 is loaded in the ICC 38.

The instruction from the instruction register 31 is also supplied to the instruction decoder 40 in addition to the address computing circuit 32. The instruction decoder 40 decodes an instruction of the instruction register 31. Control information of a condition judgement of the decode instruction is fed to the condition comparator 39. The circuit 39 judges, based on the control information, the condition code stored in the ICC 38 to determine whether the conditional branch instruction is successful or not. A judge signal of the branch success or failure is transmitted from the circuit 39 to the instruction control circuit 41. The circuit 41 determines, according to the judge signal, the next instruction to be loaded in the instruction register 31.

Figure 4:
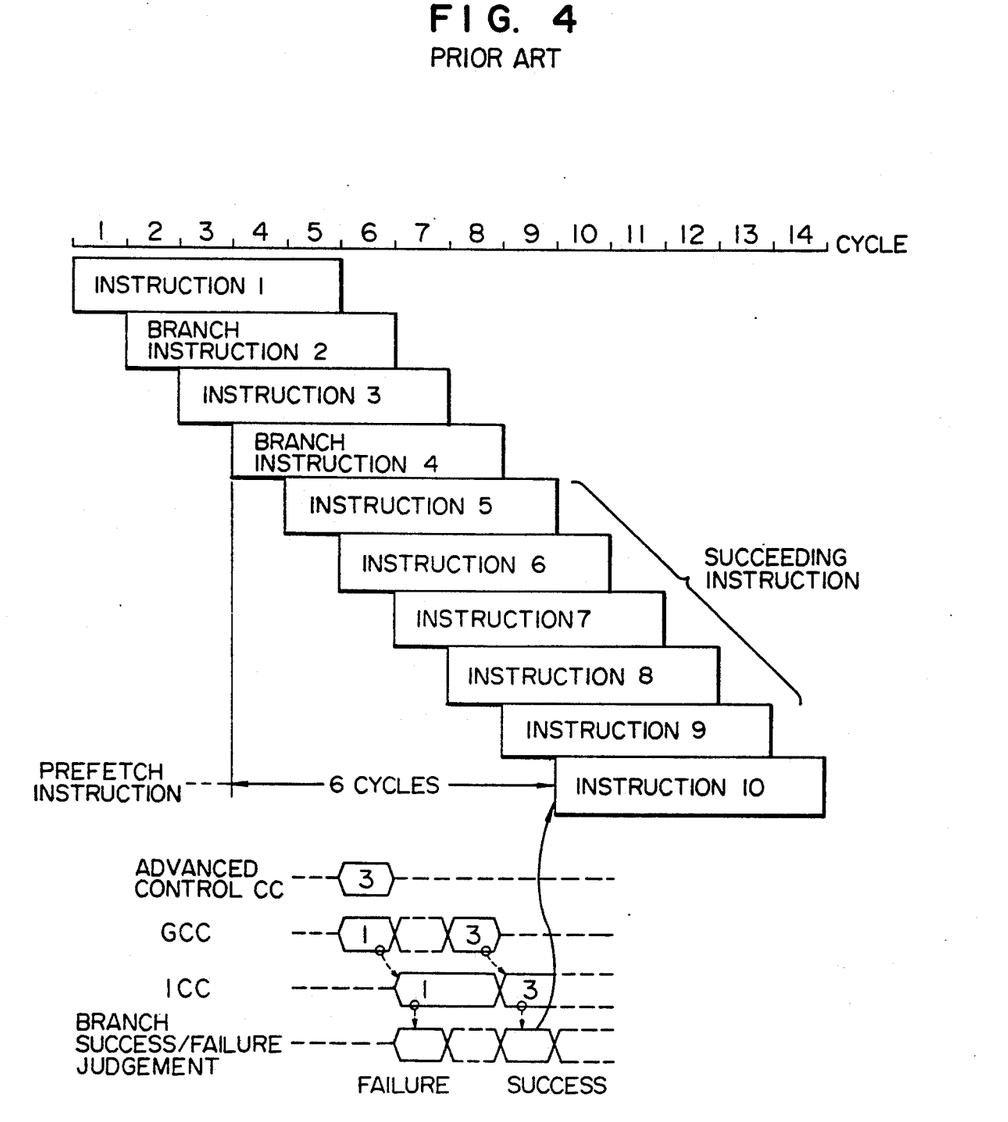
FIG. 4 is a timing chart of a pipeline control flow useful to explain the operation of the conventional information processing apparatus of FIG. 3.

FIG. 4 is a signal timing chart of a pipeline control flow for explaining the operation of the conventional information processing apparatus.

In FIG. 4, the upper-most horizontal axis stands for sequential execution cycles 1 to 14 in the pipeline control. In an advanced control processing of a sequence of instructions by a pipeline control of this example, a sequence of instructions, i.e., an instruction 1, a conditional branch instruction 2, an instruction 3, a conditional branch instruction 4, an instruction 5, and instructions 6 to 10 are assumed to be processed. In the example of FIG. 4, the instruction 1 is an instruction for which an advanced control CC cannot be attained, whereas, the instruction 3 following the instruction 2 is an instruction for which an advanced control CC can be obtained. After the instruction 4, the instructions 5 to 9 are executed. The instruction 10 is a branch destination instruction and is processed as a prefetch instruction The instruction 1 is supplied to the pipeline stage in cycle 1; thereafter, an operation of the instruction 1 is executed in cycle 5. According to a result of the operation, a CC resultant from the operation of the instruction 1 is set to the GCC 35; moreover, the CC is then transferred from the GCC 35 to the ICC 38 in cycle 7.

The branch instruction 2 is delivered to the pipeline stage in cycle 2, namely, with a delay of one cycle relative to the instruction 1. An address computation is conducted for the branch instruction 2. In cycle 6, the branch destination instruction is read from the memory 33. Subsequently, in cycle 7, a value of the CC established by the operation of the instruction 1 is referenced such that a condition judgement is conducted by the condition comparator circuit 39. Whether or not the next instruction to be executed is an instruction succeeding the branch instruction 2, i.e., the instruction 3, or is to be modified to a prefetch instruction of a branch destination instruction is decided by the instruction control circuit 41.

In consideration of a case where the branch attempt by the branch instruction 2 results in a failure, there is adopted a method in which the instruction 3 and the instructions subsequent thereto are sequentially supplied to the pipeline stage. Consequently, the instruction 3 is delivered to the pipeline stage in cycle 3. An advanced control CC of the instruction 3 is attained by an advanced control in cycle 6. However, in cycle 6, the advanced control CC conflicts with the CC of the instruction 1 loaded in the GCC 35 and hence cannot be set to the ICC 38. Consequently, the CC of the instruction 3 is attained as a CC of the operation result in cycle 8 and the obtained CC is set to the GCC 35 so as to be transferred therefrom to the ICC 38 in cycle 9.

The branch instruction 4 is fed to the pipeline stage in cycle 4. In cycle 9, the value of CC of the instruction 3 is referenced and the condition judgement is conducted by the condition comparator 39. As a result, whether an instruction to be subsequently executed is an instruction following the instruction 4, i.e., the instruction 5 or is to be changed to a prefetch instruction of the branch destination, i.e., the instruction 10 is judged by the instruction control circuit 41. If the branch is successful, the prefetch instruction is supplied to the pipeline stage in cycle 10. Namely, the delivery of the prefetch instruction is achieved with a delay of six cycles relative to the delivery of the branch instruction 4 to the pipeline stage. On the other hand, if the branch attempt fails, the instruction 4 and the instructions subsequent thereto are executed. In consideration of a failure of the branch, there is employed a method in which the instruction 4 and the instructions subsequent thereto are sequentially supplied to the pipeline stage. Consequently, no particular delay takes place. In the case where the branch is successfully conducted, these instructions beforehand loaded in the pipeline stage are invalidated and hence there does not occur any adverse result.

A known example related to the advanced control of this kind has been described in the JP-A-63-231672.

In the conventional information processing apparatus employing the pipeline control, consideration has not been given to a method of controlling the ICC when a conflict occurs between the advanced control CC and the CC attained from the computation. Resultantly, the determination of the CC of the subsequent instruction is delayed in the ICC. Consequently, there arise problems of the delay in the judgement of the conditional branch instruction for the branch success or failure and the delay in such operations as decoding and execution of the prefetch instruction of the branch destination.

SUMMARY OF THE INVENTION

It is therefore an object of the present invention to provide an advanced control method for use with an information processing apparatus using a pipeline control in which, even when a conditional branch instruction is loaded in a pipeline, advanced control is conducted to effectively continue the instruction processing.

Another object of the present invention is to provide an advanced control method in which, when a condition code attained from a computation result of a preceding instruction conflicts with an advanced control condition code obtained from an advanced control achieved on a succeeding instruction, a condition code of the succeeding instruction can be set in the ICC at an early stage of the processing, thereby conducting a judgement of the conditional branch instruction for the branch success or failure at an early point in time the processing.

In order to achieve the above objects, in accordance with the present invention, there is provided an advanced control method for use in a system comprising an advanced operation circuit for obtaining, in advance, an operation result of an instruction which can be operated in advance, an arithmetic unit for attaining a result of an operation of an instruction processing, a selector circuit for selecting either one of the operation result attained by the advanced control and the operation result obtained by the arithmetic unit, and a plurality of result storage circuits for storing therein the operation result selected by the selector circuit.

The operation result computed under the advanced control is sequentially stored in each of the plural result storage circuits associated therewith and is subjected to a judgement.

In accordance with the present invention, there are disposed a plurality of ICC's (result storage circuits), an ICC selector circuit for selecting any one of the ICC's, and an ICC control circuit for controlling the ICC selector circuits. Each time an instruction can be operated in advance, for example, a conditional branch instruction is decoded, one of the plural ICC's is allocated to the conditional branch instruction such that a condition code obtained by the advanced control achieved on the branch instruction is stored in the allocated ICC. For example, when a first conditional branch instruction is decoded, a first ICC is allocated to store therein a condition code of the branch instruction. Next, when a second conditional branch instruction is decoded, a second ICC is allocated in a similar fashion. When the condition code of the first instruction is determined, the code is stored in the first ICC; whereas, when the second instruction condition code is determined, the code is loaded in the second ICC. Moreover, depending on control information from the ICC control circuit, an arbitrary ICC is selected by the ICC selector circuit such that by referencing the value of the ICC, the judgement of the branch success or failure is conducted by the condition comparator circuit. As a result of the judgement, when the ICC becomes unnecessary, the ICC is released. When a third conditional branch instruction is decoded, the ICC is allocated thereto With at least one conditional branch instruction loaded in the pipeline stage, when a branch success judgement is conducted for a preceding conditional branch instruction, if an overrun is found in the ICC due to advanced control of a succeeding instruction, the content of the ICC allocated to the preceding instruction is restored.

As stated above, each time a conditional branch instruction is decoded, an ICC is sequentially allocated; thereafter, each time the branch success or failure judgement is conducted for the instruction, the ICC is released. Consequently, the control is not particularly disturbed and hence there is no occurrence of a wrong operation.

With the above provision, the conflict conventionally taking place when an attempt is made to load the ICC with the advanced control condition code obtained by the advanced control is avoided, and hence the condition code storing operation is achieved at an early stage of the processing. Consequently, the judgement of the conditional branch instruction for decision of the branch success or failure is conducted at an early point of time.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to the accompanying drawings, a description will be given in detail of an information processing apparatus utilizing an advanced control method in accordance with the present invention.

Figure 1:
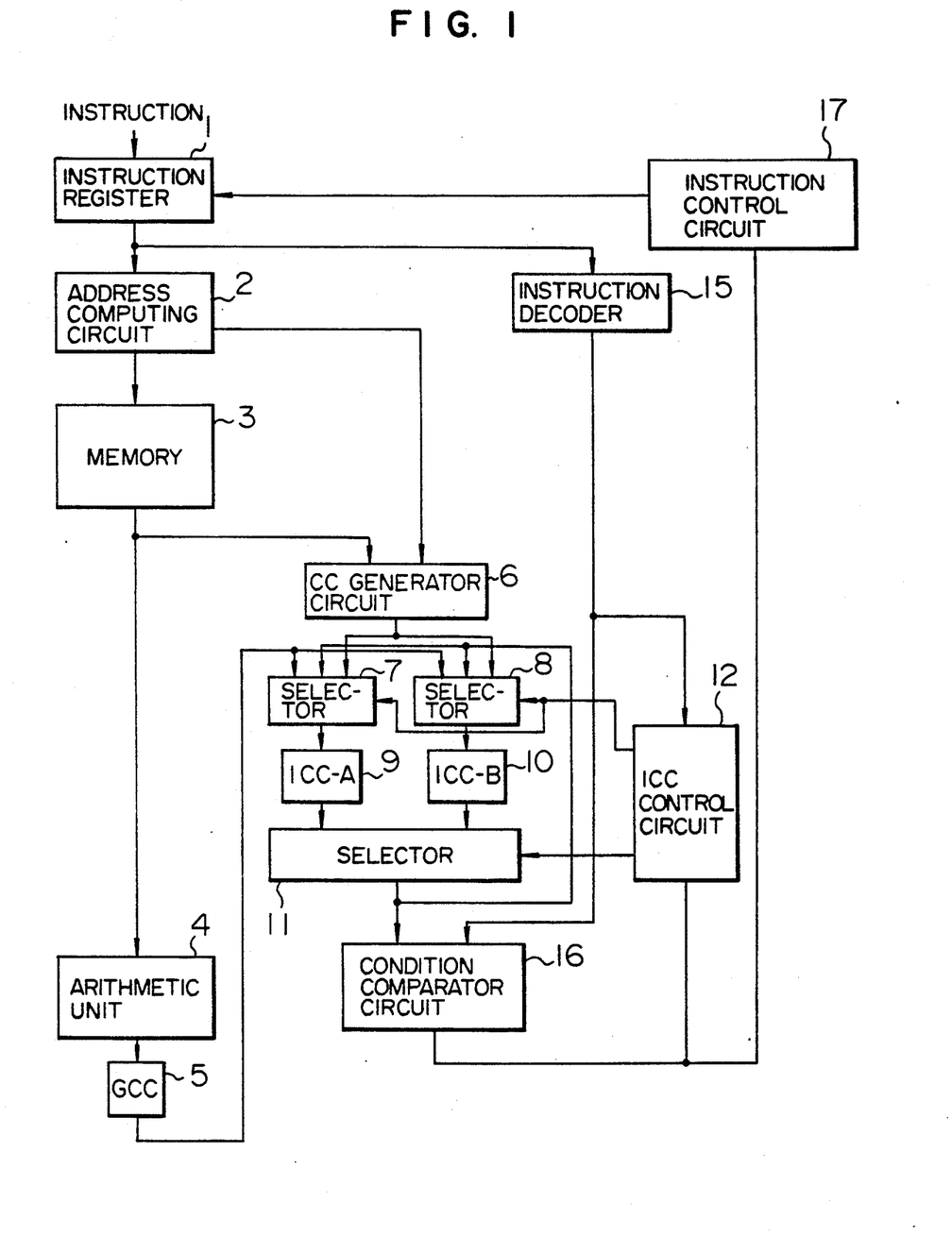
FIG. 1 is a schematic block diagram showing the configuration of the primary portion of an information processing apparatus using a pipeline control method in which a mode of an advanced control is employed in accordance with the present invention.

FIG. 1 is a block diagram showing the constitution of the primary portion of an information processing apparatus adopting the advanced control under a pipeline control in accordance with the present invention. In FIG. 1, the information processing apparatus includes an instruction register 1, an address computing circuit 2, a memory 3, an arithmetic unit 4, a register storing therein operation result condition code (GCC) 5, a condition code (CC) generator circuit 6, a first selector 7, a second selector 8, a first CC storing register (ICC-A) 9, a second CC storing register (ICC-B) 10, a third selector 11, an ICC control circuit 12, a condition comparator circuit 16, an instruction decoder 15, and an instruction control circuit 17.

The instruction control circuit 17 determines, according to an output from the condition comparator circuit 16, an instruction to be executed and then controls the instruction register 1 to latch the instruction therein. This control is due to the fact that the instruction to be executed varies depending on a success or a failure of a branch. The instruction register 1 outputs therefrom the latched instruction to the address computing circuit 2 and the instruction decoder 15.

In response to the instruction supplied from the instruction register 1, if an address computation is necessary for the instruction, the circuit 2 conducts an address computation to send a result of the address computation to the memory 3. If such address computation is unnecessary, namely, for an instruction to be operated between registers, the circuit 2 accomplishes an operation between data loaded in the associated registers to output a result of the operation to the CC generator circuit 6. Data read from the memory 3 depending on the address computation result from the circuit 2 is fed to the arithmetic unit 4 and the CC generator circuit 6. The arithmetic unit 4 accordingly carries out an operation. A condition code (CC) as an operation result is kept in the GCC 5.

The CC generator circuit 6 attains a advanced control CC, i.e., a CC of an instruction as an object of the advanced control on the basis of the operation result from the circuit 2 and the operation data read from the memory 3. The advanced control CC thus obtained is delivered to the first and second selectors 7 and 8 together with the CC loaded in the GCC 5. Moreover, a condition code output from the third selector 11 is also supplied to the first and second selectors 7 and 8. Since there may occur a case where the CC is required to be restored depending on a result of an execution of a branch instruction. Both of the first and second selectors 7 and 8 selects either one of the condition codes supplied thereto in response to a first selection signal from the ICC control circuit 12. The CC selected by the first selector 7 is stored in the ICC-A 9, whereas the CC selected by the second selector 9 is loaded in the ICC-B 10. The ICC in which the instruction CC is to be stored has been determined in advance. When a new CC is stored therein, the old CC is resultantly lost. The condition codes stored in the ICC-A 9 and ICC-B 10 are fed to the third selector 11. The third selector 11 selects, in response to a second selector signal from the circuit 12, either one of the conditions codes to send the selected code to the condition comparator circuit 16.

On the other hand, when the instruction is received from the instruction register 1, the instruction decoder 15 decodes the content of the instruction in the instruction register.

Control information of the condition judgement of the decoded instruction is fed to the circuit 16 and the ICC control circuit 12. The circuit 16 compare the CC selected by the third selector 11 with control information from the decoder 15 to determine the branch success or failure of the conditional branch instruction. A judgement signal designating the branch success or failure is sent to the circuit 12 and the instruction control circuit 17.

The ICC control circuit 12 generates the first and second selection signals in accordance with a result of a decoding operation from the decoder 15. Namely, when the decoded instruction is an instruction of which the CC is to be stored, the circuit 12 allocates an ICC to the decoded instruction and then creates a first selection signal according to the allocation. When a branch instruction is decoded, the circuit 12 generates a second selection signal such that a CC corresponding to the branch instruction is output to the circuit 16. When a result denoted by the judgement signal from the circuit 16 indicates that the CC is required to be restored, the circuit 12 generates a first selection signal such that the output from the selector 11 is selected by either of selectors 7 and 8. When the result denoted by the judge signal indicates that the branch is successful, the circuit 12 invalidates the instructions input in a period of time ranging from the input of the branch instruction to the subsequent judgement of the branch thereof.

The instruction control circuit 17 decides, in response to the judgement signal, the next instruction to be stored in the instruction register 1 and then controls the register 1 to latch the instruction.

Figure 2:
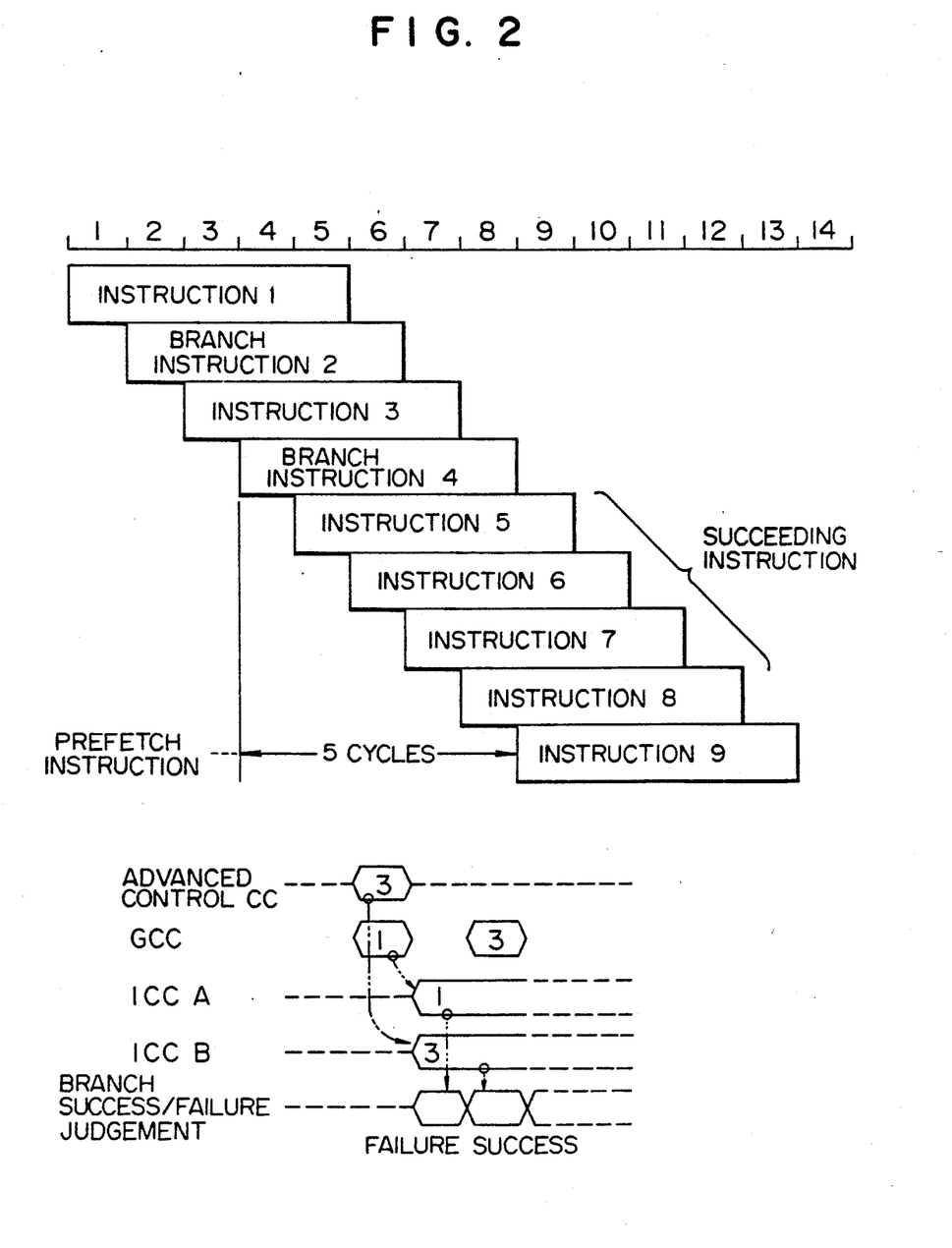
FIG. 2 is a timing chart of a pipeline control flow for explaining the operation of the information processing apparatus in accordance with the present invention.

FIG. 2 is a timing chart of a pipeline control flow for explaining the operation of the information processing apparatus in accordance with the present invention.

The pipeline control flow will now be described by reference to FIG. 2. In this diagram, the upper-most horizontal axis denotes execution cycles 1 to 14 of the pipeline. An instruction string or sequence under the pipeline control includes an instruction 1, a conditional branch instruction 2, an instruction 3, a conditional branch instruction 4, and instructions 5 to 9.

In the example of FIG. 2, the instruction 1 is an instruction for which a CC cannot be obtained through the advanced control, namely, an advanced control CC cannot be attained. The instruction 3 subsequent to the conditional branch instruction 2 is an instruction for which a CC can be decided by the advanced control. When the conditional branch instruction 2 is executed and an attempt of a branch results in a failure, the instructions 5 to 8 following the instruction 4 are executed. If the ranch is successful, the instruction 9 is executed as a branch destination instruction.

The instruction 1 is fed to the pipeline stage in cycle 1, and then an operation thereof is accomplished by the unit 4 in cycle 5. According to a result of the operation, a CC of the instruction 1 is sent to GCC 5.

The branch instruction 2 is supplied thereto in cycle 2 at a point of time when a cycle is elapsed from the delivery of the instruction 1 to the pipeline stage. When the branch instruction 2 is decoded by the decoder 15, in order to store a CC necessary for the determination of the branch success or failure of the instruction 2 in either one of the ICC-A 9 and ICC-B 10, namely, in the ICC-A 9 in this example, control information is output to the circuits 12 and 16. In accordance with the CC output from the selector 11 in response to a control signal from the circuit 12, the CC of the instruction 1 stored in the GCC 5 is loaded via the selector 7 into the ICC-A 9 in cycle 7. On the other hand, in cycle 7, when the CC of the instruction 1 is stored in the ICC-A 9, a CC is simultaneously read from an ICC selected depending on the control signal from the circuit 12 such that the branch success or failure is determined by the circuit 16 based on the control information of the instruction 2 from the decoder 15. Assume that a branch failure is determined as a result of the judgement in this case.

In consideration of the branch failure in an execution of the branch instruction 2, the instruction 3 is delivered to the pipeline stage in cycle 3. In cycle 6, based on the operation data from the memory 3, an advanced control CC of the instruction 3 is attained by the circuit 6. In cycle 7, like in the case of the instruction 2, the advanced control CC is loaded in the ICC-B 10. According to the data from the memory 3, an operation is executed by the unit 4. In accordance with a result of the operation, a CC of the instruction 3 is sent to the GCC 5 in cycle 8.

The branch instruction 4 is supplied to the pipeline stage in cycle 4. When the instruction 4 is decoded by the decoder 15, in order to store a CC necessary for the judgement of the instruction 4 for the branch success or failure, the ICC-B 10 is assigned to the instruction 3 as described above. An advanced control CC of the instruction 3 obtained in cycle 6 is loaded in the ICC-B 10 in cycle 6. Although the CC of the instruction 1 conflicts with the advanced control CC of the instruction in this situation, the different storage destinations ICC-A 9 and ICC-B 10 have been assigned thereto and hence there is no problem. In cycle 8, according to the CC of the ICC-B 10 selected in association with the control signal from the circuit 12 and control information of the instruction 4, a determination of the branch success or failure is conducted The prefetch instruction (instruction 9) is delivered to the pipeline stage in cycle 9 delayed from the delivery of the branch instruction 4 by five cycles.

As stated above, according to the present invention, with the provision of a plurality of condition code storing registers (ICC's i.e., ICC-A and ICC-B), the ICC selector circuit for selecting one of the plural ICC's, and the ICC control circuit for controlling the ICC selector circuit, each time a conditional branch instruction is decoded, one of the ICC's is assigned to the branch instruction and then a condition code necessary for the advanced control in an execution of the branch instruction is stored in the assigned ICC.

As result, the advanced control CC thus obtained through the advanced control can be loaded in the ICC without any conflict. Consequently, the determination of the branch success or failure of the conditional branch instruction can be resultantly conducted without delay or at an early stage of the processing.

In accordance with the present invention, although there is disposed only one condition comparator circuit, there may be disposed a plurality of condition comparator circuits in association with the plural ICC's so that the determination of the branch success or failure is achieved for a plurality of conditional branch instructions at the same time. As a result, for example, in the operation example above, the branch destination instruction 9 of the branch instruction 4 can be fed to the pipeline stage in cycle 8 delayed from the delivery of the branch instruction 4 by only four cycles. Namely, the delivery of the instruction 9 to the pipeline is carried out at an earlier stage in the processing.

If the judgement of the branch instruction for the branch results in a failure in cycle 7, the original data of the ICC-A is restored and is loaded in the ICC-B and then the succeeding instructions loaded beforehand in the pipeline stage are invalidated.

In accordance with the present invention, the judgement of a conditional branch instruction for the branch success or failure can be accomplished at an earlier point of time in the processing; moreover, the decoding and execution of a prefetch instruction at a branch destination of the branch instruction can be conducted also at an early stage. Consequently, the efficiency of the pipeline operation is improved and the processing speed of the information processing apparatus is increased.

While particular embodiments of the invention have been shown and described, it will be obvious to those skilled in the art that various changes and modifications may be made without departing from the present invention in its broader aspects.

We claim:

1. An information processing apparatus having a memory in which a pipeline control is applied to a sequence of instructions to be executed, the sequence of instructions including a plurality of conditional branch instructions, each of which determines whether a branch is successful or not based on a condition code obtained from a previously executed instruction, said apparatus comprising:

instruction providing meand for sequentially providing each individual instruction of the sequence of instructions to effect a pipeline operation thereon, wherein the instruction proividing means provides instructions, which occur in said sequence subsequent to a conditional branch instruction, before determining whether the branch is successful or not;

computing means for obtaining a first condition code by executing a first type of conditional branch instruction which is capable of execution without a memory address thereof, and for obtaining the memory address for a second type of instruction which requires the memory address information for execution;

arithmetic means for receiving, from the memory, advance operation data specified by a memory address obtained by the computing means, and for obtaining a second condition code resulting from the execution of the second type of instruction using the received advance operation data;

holding means responsive to said computing means and said arithmetic means for holding therein both of the first and second condition codes, wherein the holding means includes means for selecting the second condition code resulting from the execution of the second type of instruction before determining whether an objective conditional branch specified by that conditional branch instruction is successful or not; and determining means for comparing branch control information of the objective condition branch instruction with the selected second condition code output from the holding means, and for determining whether the objective conditional branch instruction is successful or not.

2. An information processing apparatus according to claim 1, wherein said determining means includes means responsive to a result of the comparison for selectively invalidating instructions read in the apparatus in a period of time ranging from the input of the conditional branch instruction to the determination of the branch success or failure.

3. An information processing apparatus according to claim 1, wherein said holding means includes:
a plurality of holding circuits for holding instruction results;
first selecting means responsive to a first selection signal input thereto, for selecting either one of the first condition code and the second condition code and storing the selected condition code in one of the plural holding circuits, said holding circuits being allocated to the respective instructions;
second selecting means responsive to a second selection signal for outputting to said determining means, in accordance with the objective conditional branch instruction, the condition code from the holding circuit allocated to the instruction corresponding to the objective conditional branch instruction; and
means for generating the first and second selection signals in accordance with a result obtained as a result of a decoding of the instruction, thereby controlling said first and second selecting means.

4. An information processing apparatus according to claim 1, wherein said determining means further comprises:
means for outputting a judgement signal denoting a branch success or failure; and
means operative when the first condition code undergoes an overrun through an advanced control of an instruction succeeding the branch instruction, for restoring, in response to a judgement signal designating a branch success, the first condition code assigned to the preceding condition branch instruction.

5. An information processing apparatus according to claim 4, wherein said holding means includes:
a plurality of holding circuits for holding operation results therein;
first selecting means responsive to a first selection signal input thereto, for selecting either one of the first condition code, the second condition code, and an instruction execution result input thereto and storing the selected result in one of the plural holding circuits, said holding circuits being allocated to the respective instructors;
second selecting means responsive to a second selection signal for outputting to said determining means and said first selecting means in accordance with the objective conditional branch instruction the result from the holding circuit allocated to the instruction corresponding to the objective conditional branch instruction; and
means for generating the first and second selecting signals in accordance with a result obtained as a result of a decoding of the instruction, thereby controlling said first and second selecting means.

6. A method for use in an information processing apparatus for executing a sequence of instructions including a plurality of conditional branch instructions under a pipeline control and an advanced control, said method comprising the steps of:
sequentially holding each instruction of the sequence of instructions in a pipeline operation;
obtaining a first condition code by executing a first type of conditional branch instruction which is capable of execution without a memory address thereof, and for obtaining the memory address for a second type of conditional branch instruction which requires the memory address information for execution;
receiving, from the memory, advance operation data specified by a memory address obtained by the computing means, and for obtaining a second condition code resulting from the execution of the second type of instruction using the received advance operation data;
holding either one of the first condition code and the second condition code;
selecting, at an execution of an objective conditional branch instruction selected from the plural conditional branch instructions, a condition code resulting from the execution of a particular instruction corresponding to the objective conditional branch instruction;
comparing branch control information of the objective conditional branch instruction with the selected condition code;
determining a branch success or failure of the objective conditional branch instruction; and
determining a next instruction to be executed in accordance with the objective conditional branch instruction.

7. A method according to claim 6, wherein said holding step includes a step of selectively invalidating, in response to a result of the comparison, instructions read in the apparatus in a period of time ranging from the input of the conditional branch instruction to the determination of the branch success or failure.

8. A method according to claim 6, wherein said holding step includes a step responsive to a first selection signal input thereto for selecting either one of the first condition code and the second condition code and storing the selected operation result in one of the plural holding circuits, the holding circuits being allocated to the respective instructions;
said holding step includes a step responsive to a first selection signal input thereto for selecting either one of the first condition code and the second condition code and storing the selected condition code in one of the plural holding circuits, the holding circuits being allocated to the respective instructions; and
said outputting step includes a step responsive to a second selection signal of outputting the selected condition code the holding circuit identified in accordance with the objective conditional branch instruction and allocated to the instruction corresponding to the objective conditional branch instruction.

9. A method according to claim 6, wherein
said determining step further comprises a step of outputting a judgement signal denoting a branch success or failure; and said outputting step includes a step operative when the first condition code undergoes an overrun through an advanced control of an instruction succeeding the branch instruction of restoring, in response to a judgement signal designating a branch success, the first condition code assigned to the preceding condition branch instruction.

10. A method according to claim 6, wherein said holding step includes a step responsive to a first selection signal for selecting either one of the first condition code, the second condition code, and an instruction execution result input thereto and storing the selected result in one of the plural holding circuits, the holding circuits being allocated to the respective instructions; and said outputting step includes a step responsive to a second selection signal for outputting in accordance with the objective conditional branch instruction the operation result from the holding circuit allocated to the instruction corresponding to the objective conditional branch instruction.

* * * * *